United States Patent [19]

Furutani et al.

[11] Patent Number: 4,514,270

[45] Date of Patent: Apr. 30, 1985

[54] PROCESS FOR REGENERATING CLEANING FLUID

[75] Inventors: Yasumasa Furutani, Katsuta; Yasuo Hira, Hitachi; Takashi Hasegawa, Ibaraki; Akira Minato, Hitachi; Osao Sumita, Hitachi; Hisao Itow, Hitachi, all of Japan

[73] Assignee: Hitachi, Ltd., Tokyo, Japan

[21] Appl. No.: 423,195

[22] Filed: Sep. 24, 1982

[30] Foreign Application Priority Data

Sep. 25, 1981 [JP] Japan ............................... 56-150627

[51] Int. Cl.[3] ......................... C25C 1/06; B01D 13/02

[52] U.S. Cl. .................................... 204/151; 204/130; 204/112; 204/301; 204/252

[58] Field of Search ................. 204/151, 149, 302, 48, 204/282, 252, 180 P, 301, 130, 112

[56] References Cited

U.S. PATENT DOCUMENTS

| | | | |
|---|---|---|---|
| 3,909,381 | 9/1975 | Ehrsam | 204/151 |
| 3,933,605 | 1/1976 | Butler et al. | 204/149 |
| 4,030,989 | 6/1977 | Atmore et al. | 204/112 |
| 4,046,663 | 9/1977 | Fleet et al. | 204/149 |
| 4,149,946 | 4/1979 | Burke | 204/151 |
| 4,149,951 | 4/1979 | Eddleman | 204/151 |
| 4,308,122 | 12/1981 | Das Gupta et al. | 204/151 |

*Primary Examiner*—John F. Niebling
*Assistant Examiner*—B. J. Boggs, Jr.
*Attorney, Agent, or Firm*—Antonelli, Terry & Wands

[57] ABSTRACT

A cleaning fluid such as a chemical decontamination solution originally containing one or more cleaning or decontamination reagents in low concentrations and deteriorated after a cleaning or decontamination treatment step by containing metal oxides therein can be regenerated by introducing such a deteriorated cleaning fluid into an electrolytic cell, passing a direct current through said cleaning fluid between two electrodes, and removing said metal oxides by depositing dissolved metal ions on the cathode as metals from the cleaning fluid.

20 Claims, 2 Drawing Figures

PROCESS FOR REGENERATING CLEANING FLUID

Figure 1:
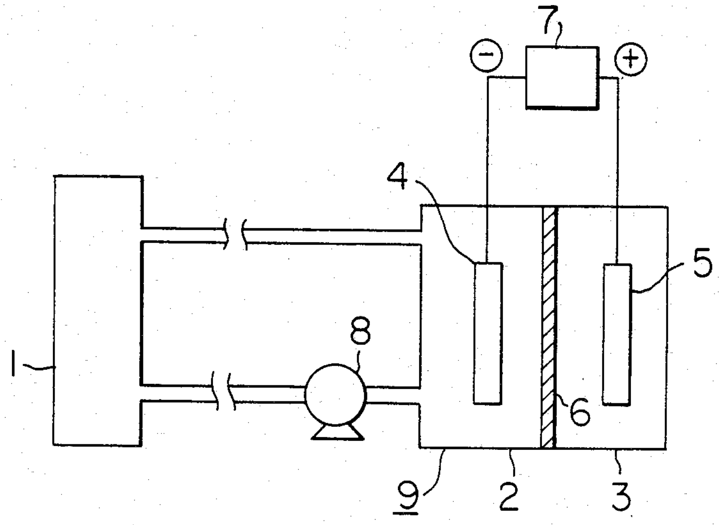

This invention relates to a process for regenerating a cleaning fluid containing one or more cleaning reagents in low concentrations, more particularly to a process for regenerating a chemical decontamination solution containing one or more decontamination reagents in low concentrations.

In pipes of primary cooling systems or devices used in nuclear plants, radionuclides including $^{60}Co$ mainly are accumulated with an increase of operating years to increase dose rates. These radionuclides are incorporated in oxide films produced on surfaces of the pipes and devices and accumulated. In order to lower these dose rates, there is carried out industrially a process for removing these radionuclides by dissolving them together with the oxide films using a chemical decontamination solution containing one or more reagents.

As the chemical decontamination solution, there are generally used solutions containing an organic acid such as oxalic acid, citric acid, etc., a chelating agent such as ethylenediaminetetraacetic acid (EDTA), nitrilotriacetic acid (NTA), etc., a reducing agent such as L-ascorbic acid, hydrazine, etc., usually in combination thereof. When a chemical decontamination solution containing these reagents in high concentrations is used, the reagents in the solution are hardly consumed by dissolution of metal oxides during the decontamination and thus the chemical decontamination solution is hardly deteriorated. In such a case, the regeneration of the chemical decontamination solution is not so important, but there are some problems in that a large amount of decontamination waste containing these reagents in high concentrations is produced, there is a fear of corrosion of pipes and devices which contact with said highly concentrated chemical decontamination solution during the decontamination treatment, etc. On the other hand, when a chemical decontamination solution containing these reagents in low concentrations is used, the treatment of decontamination waste is easy and the corrosion of pipes and devices is slight. But in such a case, there arises another defect in that the reagents are consumed by the dissolution of metal oxides during the decontamination and thus the dissolution of metal oxides is stopped when used to some extent, which makes sufficient decontamination impossible. In such a case, it is necessary to regenerate the waste decontamination solution.

As processes for regenerating deteriorated chemical decontamination solutions, there has been proposed a process for treating a deteriorated chemical decontamination solution with a cation exchange resin so as to remove metal ions of metal oxides contained therein by replacement by hydrogen ions. But when a chemical decontamination solution containing a chelating agent having strong chelating force for metal ions is used, the cation exchange resin cannot remove the metal ions. Therefore, such a process is disadvantageous in that the kinds of chemical decontamination solutions usable for the regeneration treatment are very limited, etc.

On the other hand, in the case of thermoelectric power plants, it is also necessary to remove metal oxide coatings formed on surfaces of pipes and devices in order to improve thermal efficiency by using a cleaning fluid. If such a contaminated cleaning fluid can be regenerated easily, it may be preferable from the viewpoints of saving of resources and prevention of water pollution, etc.

It is an object of this invention to provide a process for regenerating a cleaning fluid including a chemical decontamination solution containing metal oxides obtained by a cleaning step or a decontamination step by removing dissolved metal ions overcoming disadvantages of the prior art process, even if a chelating agent having strong chelating force may be included therein.

This invention provides a process for regenerating a cleaning fluid obtained from a cleaning step, which comprises introducing a cleaning fluid containing metal oxides obtained by cleaning operation into an electrolytic cell having an anode and a cathode, passing a direct current through said cleaning fluid between the two electrodes, and removing said metal oxides by depositing dissolved metal ions on the cathode as metals from the cleaning fluid.

Figure 2:
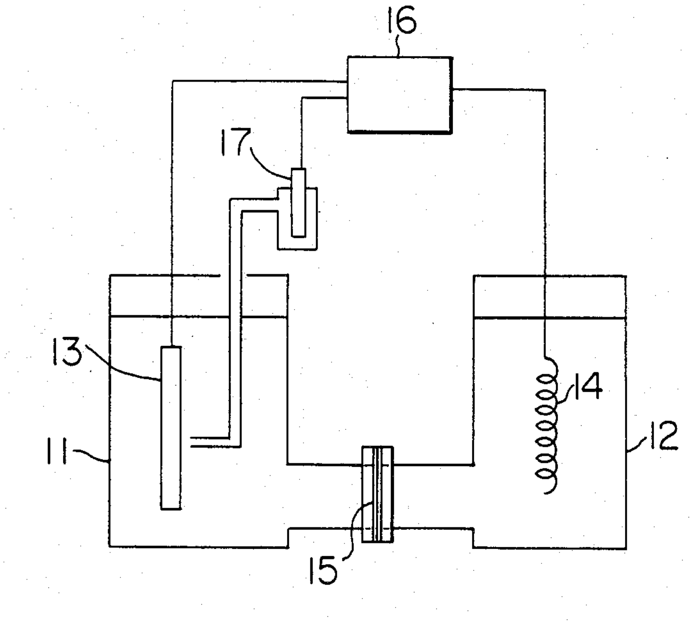

In the attached drawings, FIG. 1 is a schematic diagram showing a regeneration apparatus for a chemical decontamination solution circulated from a decontamination treatment step according to this invention, and FIG. 2 is a schematic diagram showing a constant potential electrolytic apparatus for regeneration of a chemical decontamination solution usable in this invention.

The process for regenerating a cleaning fluid according to this invention is particularly effective when the cleaning fluid contains one or more cleaning reagents in low concentrations as low as 1% by weight or lower as a total. There is no particular limit to the lower limit of the reagent amounts, if there are sufficient amounts for cleaning or decontamination, e.g., 0.01% by weight or more.

In this invention, the term "cleaning fluid" means not only a usual cleaning fluid used, for example, in thermoelectric power plants but also a chemical decontamination solution used in nuclear plants. The term "cleaning reagent" means not only inorganic or organic acids usually used for cleaning but also decontamination reagents such as organic acids, e.g., formic acid, oxalic acid, citric acid, and the like and their salts such as ammonium salts, chelating agents such as EDTA and its ammonium, Na, K salts and the like, NTA and its ammonium, Na, K salts and the like, reducing agents such as L-ascorbic acid and its salts, hydrazine, and the like. The term "cleaning step" means not only a usual cleaning operation or treatment step but also a decontamination treatment step for removing radioactive contamination.

This invention will be explained in detail referring to the attached FIGS. 1 and 2.

In FIG. 1, the chemical decontamination solution obtained from the decontamination treatment step 1 is introduced into an electrolytic cell 9 having an anode 5 and a cathode 4. A direct current is flowed between the cathode 4 and the anode 5 passed from a direct current power source 7. The amount of current between the two electrodes is properly controlled depending on the kinds and concentrations of the reagents and metal oxides from which metals are deposited contained in the chemical decontamination solution to be regenerated. That is, the potential necessary for depositing metals from metal ions is different depending on the kinds and concentrations of metal ions and the kinds and concentrations of chelating agents contained therein. Therefore, it is important to flow the current between the two electrodes so as to make the potential of the cathode equal to or lower than the potential necessary for depositing metals from the metal ions.

Pipes and devices used in nuclear plants are made of alloys of iron mainly. The oxides formed on surfaces of the pipes and devices to be cleaned are almost iron oxides. Therefore, metal ions of metal oxides dissolved in the chemical decontamination solution are almost all iron ions including ferric and ferrous ions. Therefore, if at least iron ions are removed from the decontamination solution, the decontamination solution will be regenerated and can be used again. The iron ions may be deposited on the cathode as metallic iron as shown in the following formula:

$$Fe^{++} + 2e \rightarrow Fe \quad (1)$$

In this case, the standard electrode potential of the reaction is −0.44 V (hydrogen electrode standard). Thus, when the concentration of iron ions is 1 mole/1, metallic iron is deposited on the cathode by maintaining the cathode potential equal to or below the above-mentioned potential. But when the concentration of iron ions is low or a chelating agent having greater chelating force is included therein, the potential necessary for depositing metallic iron becomes lower than the above-mentioned value. For example, when iron ions are dissolved in an amount of 0.002 mole/1 in a chemical decontamination solution containing EDTA in an amount of 0.002 mole/1, the balanced potential with the metallic iron is −0.7 V. Therefore, metallic iron can be deposited on the cathode by passing the current between the two electrodes so as to maintain the cathode potential equal to or below that value.

The amount of current passing through the two electrodes in electrolytic cell can easily be determined considering the kinds and concentrations of metal ions to be deposited or the reagents contained in the chemical decontamination solution and preferable cathode potential can easily be determined by experiments or calculations. In a practical electrolysis, it is preferable to pass the current so as to maintain the cathode potential lower than the theoretical value by 0.3 V considering overvoltage phenomena.

In order to maintain the cathode potential at a constant value or lower so as to deposit metals from metal ions on the cathode, it is preferable to use a constant-potential electrolysis apparatus having a potentiostat 16 as shown in FIG. 2 as a power source. Further, since it is considerably difficult to correctly measure or control the cathode potential due to low electric conductance of the chemical decontamination solution with low reagent concentration, the electrolysis can be conducted in practical electrolysis operation by using a current density equal to or below the desired potential by means of a constant-current electrolysis apparatus, while a relationship between the current density and potential in the solution to be electrolyzed is obtained prior to the practical operation.

It is particularly desirable to use the electrolytic cell as shown in FIG. 1 wherein the cell is divided into a cathode chamber 2 and an anode chamber 3 by a membrane 6. Such a structure is effective for preventing a reducing agent contained sometimes in the chemical decontamination solution, an organic acid and chelating agent which are major components of the chemical decontamination solution from deterioration by oxidation at the anode. As the membrane, it is preferable to use a cation exchange resin.

As to the cathode, it is particularly preferable to use one made from a combustible material such as carbon, e.g., porous carbon, carbon fibers, and the like, which have a large surface area. That the cathode is combustible has an important meaning that the treatment after the deposition of metals is easy and convenient.

In this invention, it is particularly advantageous to recycle the regenerated chemical decontamination solution taken out of the cathode chamber 2, wherein dissolved metal ions are deposited on the cathode 4 as metals to regenerate the decontamination solution, by a pump 8 for use in the decontamination treatment step 1 as shown in FIG. 1.

In the case of regenerating a chemical decontamination solution containing a strongly acidic reagent and having a pH of below 2, there is a tendency to lower the deposition efficiency of metals from metal ions since the cathode current is mostly consumed by the generating of hydrogen gas from hydrogen ions. Therefore, this invention is particularly preferable for regenerating chemical decontamination solutions having not so low pH values.

This invention is illustrated by way of the following Examples.

EXAMPLE 1

To 1 liter of an aqueous solution containing EDTA-$2NH_4$ (ammonium salt of EDTA) in an amount of 0.002 mole/1, 1 g of iron oxide was added and maintained at 90° C. for 2 hours (corresponding to a cleaning step). As a result, the concentration of iron ions in the aqueous solution was 70 ppm. The supernatant solution was introduced into a cathode chamber 11 of an electrolytic cell shown in FIG. 2, wherein the cathode chamber 11 and an anode chamber 12 was separated by a cation exchange resin film 15. Maintaining the cathode potential at −1.2 V by a potentiostat 16, iron ions were deposited on a cathode 13 made from a porous carbon as metallic iron. In FIG. 2, numeral 14 denotes an anode and numeral 17 a calomel electrode. After 1 hour, the concentration of iron ions in the cathode chamber 11 was lowered to 25 ppm. To this solution, 1 g of iron oxide was added and maintained at 90° C. for 2 hours. The resulting solution had the concentration of iron ions of 65 ppm. This means that the solution was regenerated by the reduction at the cathode.

EXAMPLE 2

To 1 liter of an aqueous solution containing EDTA-$2NH_4$ in an amount of 0.002 mole/1 and diammonium citrate in an amount of 0.002 mole/1, 1 g of iron oxide was added and maintained at 90° C. for 2 hours. As a result, the concentration of iron ions in the aqueous solution was 95 ppm. The supernatant solution was subjected to electrolysis in the same manner as described in Example 1. After 1 hour, the concentration of iron ions in the cathode chamber 11 was lowered to 28 ppm. To this solution, 1 g of iron oxide was added and maintained at 90° C. for 2 hours. The resulting solution had the concentration of iron ions of 90 ppm. This means that the solution was regenerated by the reduction at the cathode.

EXAMPLE 3

In 3 liters of an aqueous solution containing EDTA-$2NH_4$ in an amount of 0.002 mole/1 and diammonium citrate in an amount of 0.002 mole/1, a carbon steel pipe having an inner diameter of 5 cm and a length of 20 cm, the inner surface thereof being covered with iron oxide, was dipped using a vessel. This vessel was connected to the electrolytic cell used in Example 1 via a pump and the aqueous solution was recycled at 80° C. for 5 hours. As a result, almost all the iron oxide attached to the inner surface of the pipe was removed. The concentration of iron ions in the cleaning fluid at the completion of the test was 57 ppm.

On the other hand, when iron ions were not removed by the electrolysis from the fluid while conducting the test in a similar manner as mentioned above, the iron oxide on the inner surface of the carbon steel pipe was retained in large amounts after 10 hours' recycling. The concentration of dissolved iron ions in the fluid at the final stage was 93 ppm.

From these results, it is clear that the cleaning fluid deteriorated by dissolving iron oxides can be regenerated by removing the dissolved iron ions by electrolysis from the fluid and that the removal of undesirable metal oxides can be conducted continuously.

As mentioned above, according to this invention, the cleaning fluid or the chemical decontamination solution containing metal oxides obtained from the cleaning step or decontamination treatment step can be regenerated by removing the metal ions of metal oxides by means of electrolysis by depositing the metals on the cathode. This process can well be applied to chemical decontamination solutions having chelating agents with strong chelating force. This process can also be applied to regeneration of acidic cleaning fluids used in thermoelectric power plants.

What is claimed is:

1. A process for regenerating a cleaning fluid obtained from a cleaning step, which comprises:

introducing a cleaning fluid containing at least an organic reagent or a reducing agent, and metal oxides obtained by cleaning operation into a cathode chamber of an electrolytic cell having an anode and a cathode, the electrolytic cell being divided into said cathode chamber and an anode chamber by a cation exchange resin film, passing a direct current through said cleaning fluid between the two electrodes, removing said metal oxides by depositing dissolved metal ions on the cathode as metals from the cleaning fluid, to recycle the resulting regenerated cleaning fluid from the cathode chamber, and recycling the regenerated cleaning fluid from the cathode chamber to the cleaning step.

2. A process according to claim 1, wherein the cleaning fluid containing at least an organic reagent or a reducing agent is a chemical decontamination solution containing one or more decontamination reagents in amounts of 1% by weight or less as a total.

3. A process according to claim 1, wherein the cathode is made from a combustible material.

4. A process according to claim 3, wherein the combustible material is porous carbon or carbon fibers.

5. A process according to claim 1, wherein a direct current is passed between the two electrodes so as to make the cathode potential equal to or lower than the potential necessary for depositing metals from the metal ions.

6. A process according to claim 1, wherein the metal oxides are iron oxides.

7. A process according to claim 1, wherein said cleaning fluid is a chemical decontamination solution.

8. A process according to claim 7, wherein said chemical decontamination solution includes at least one reagent selected from the group consisting of formic acid, oxalic acid, citric acid, and ammonium salts thereof, EDTA and its ammonium, Na and K salts, NTA and its ammonium, Na and K salts, L-ascorbic acid and salts thereof and hydrazine.

9. A process according to claim 5, wherein the cathode potential is at least 0.3 V lower than the potential necessary for depositing metals from the metal ions.

10. A process according to claim 1, wherein the cleaning fluid has a pH of at least 2.

11. A process according to claim 1, wherein the cleaning fluid contains an organic reagent, said organic reagent being an organic acid or organic chelating agent.

12. A process according to claim 1, wherein the regenerated cleaning fluid is recycled from the cathode chamber without passing through the anode chamber.

13. A process for regenerating a cleaning fluid obtained from a cleaning step in nuclear plants, which comprises:

introducing a cleaning fluid containing metal oxides obtained by cleaning operation into a cathode chamber of an electrolytic cell having an anode and a cathode, said cleaning fluid being a chemical decontamination solution containing one or more decontamination reagents in amounts of 1% by weight or less as a total and said electrolytic cell being divided into a cathode chamber and an anode chamber by a cation exchange resin film, passing a direct current through said cleaning fluid between the two electrodes, removing said metal oxides by depositing dissolved metal ions on the cathode as metals from the cleaning fluid to recycle the resulting regenerated cleaning fluid from the cathode chamber, and recycling the regenerated cleaning fluid from the cathode chamber to the cleaning step.

14. A process according to claim 13, wherein the cathode is made from a combustible material.

15. A process according to claim 14, wherein the combustible material is porous carbon or carbon fibers.

16. A process according to claim 13, wherein a direct current is passed between the two electrodes so as to make the cathode potential equal to or lower than the potential necessary for depositing metals from the metal ions.

17. A process according to claim 13, wherein the metal oxides are iron oxides.

18. A process according to claim 13, wherein the regenerated cleaning fluid is recycled from the cathode chamber without passing through the anode chamber.

19. A process according to claim 1, wherein said at least an organic reagent or a reducing agent is contained in the cleaning fluid in an amount of 1% by weight or less as a total.

20. A process according to claim 19, wherein said cleaning fluid contains an organic reagent.

* * * * *